United States Patent
White, III

(10) Patent No.: US 11,708,765 B1
(45) Date of Patent: Jul. 25, 2023

(54) GAS TURBINE ENGINE ARTICLE WITH BRANCHED FLANGE

(71) Applicant: RAYTHEON TECHNOLOGIES CORPORATION, Farmington, CT (US)

(72) Inventor: Robert A. White, III, Meriden, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/743,521

(22) Filed: May 13, 2022

(51) Int. Cl.
*F01D 5/28* (2006.01)
*F01D 5/20* (2006.01)

(52) U.S. Cl.
CPC ............... *F01D 5/282* (2013.01); *F01D 5/20* (2013.01); *F01D 5/284* (2013.01); *F05D 2300/6033* (2013.01)

(58) Field of Classification Search
CPC ............ F01D 5/282; F01D 5/20; F01D 5/284
See application file for complete search history.

(56) References Cited

U.S. PATENT DOCUMENTS

| | | | |
|---|---|---|---|
| 6,679,062 B2 | 1/2004 | Conete et al. | |
| 9,739,157 B2 * | 8/2017 | Uskert | F01D 5/187 |
| 11,454,129 B1 * | 9/2022 | Quach | F01D 5/284 |
| 2019/0323363 A1 * | 10/2019 | Sippel | F01D 5/288 |
| 2020/0063592 A1 * | 2/2020 | Barker | F01D 11/08 |
| 2020/0095893 A1 * | 3/2020 | Blaney | C04B 35/80 |
| 2021/0054745 A1 | 2/2021 | Vetters et al. | |
| 2021/0102469 A1 * | 4/2021 | Sobanski | F01D 5/282 |
| 2021/0131296 A1 * | 5/2021 | Sobanski | F01D 9/041 |
| 2021/0246808 A1 * | 8/2021 | Sobanski | F01D 9/04 |

* cited by examiner

*Primary Examiner* — Long T Tran
(74) *Attorney, Agent, or Firm* — Carlson, Gaskey & Olds, P.C.

(57) ABSTRACT

An airfoil for a gas turbine engine includes a fiber-reinforced laminate composite airfoil fairing that defines a platform that has first and second radial sides, an airfoil section that extends off of the first radial side, and a branched flange that extends off of the second radial side. The branched flange includes a trunk that radially extends off of the second radial side and at least one branch that extends off of the trunk.

18 Claims, 4 Drawing Sheets

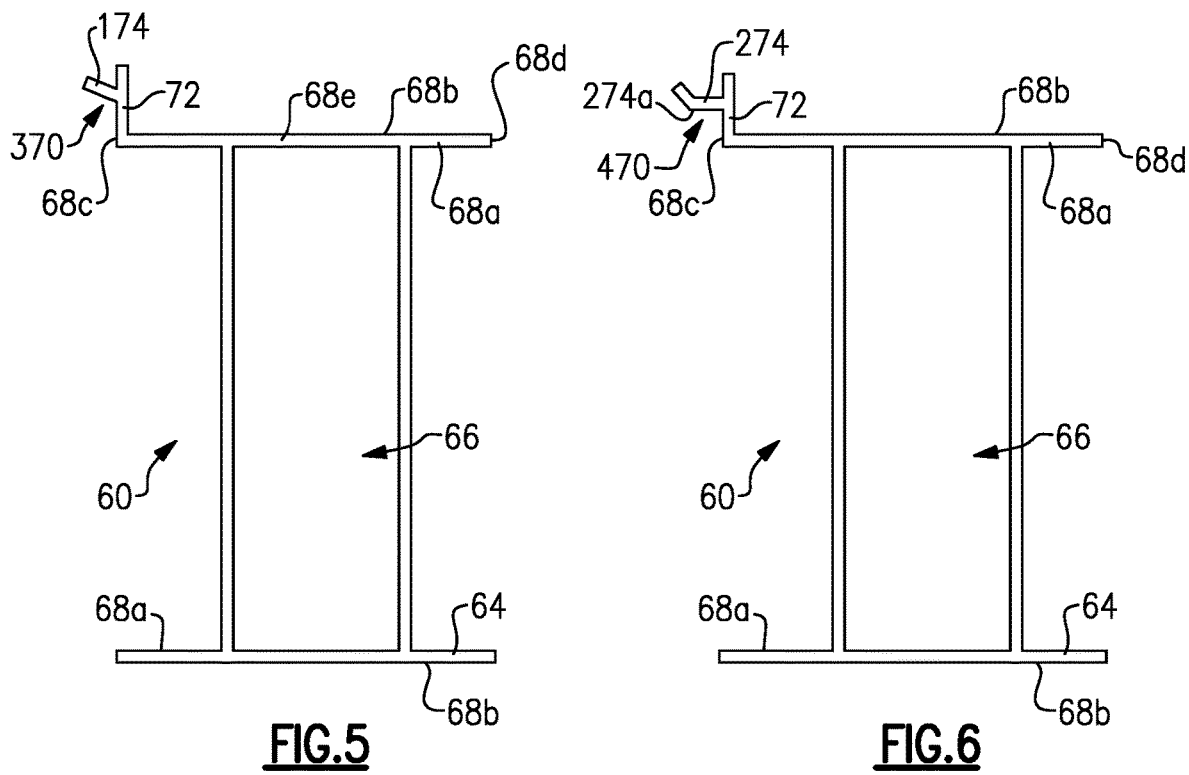
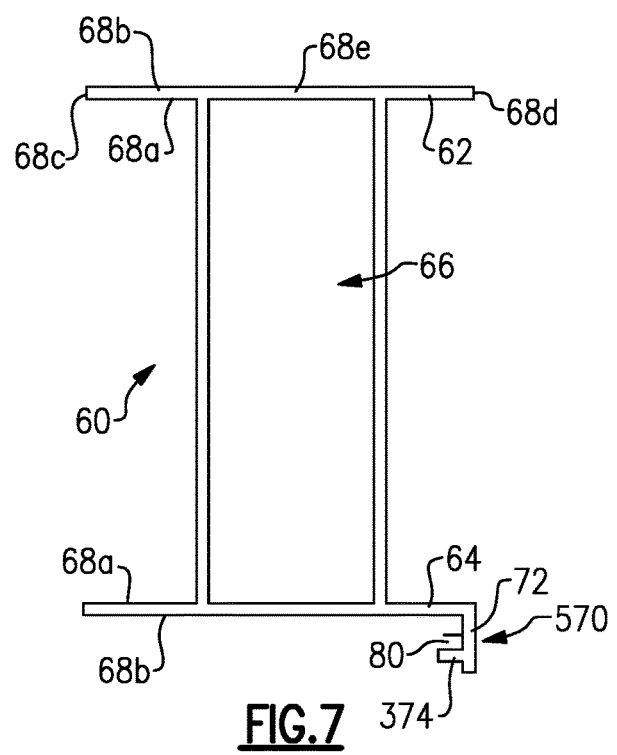

GAS TURBINE ENGINE ARTICLE WITH BRANCHED FLANGE

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil for a gas turbine engine according to an example of the present disclosure includes a fiber-reinforced laminate composite airfoil fairing that defines a platform having first and second radial sides, an airfoil section that extends off of the first radial side, and a branched flange that extends off of the second radial side. The branched flange includes a trunk radially that extends off of the second radial side and at least one branch that extends off of the trunk.

In a further embodiment of any of the foregoing embodiments, the at least one branch includes first and second branches.

In a further embodiment of any of the foregoing embodiments, the first and second branches extend in opposite directions off of the trunk.

In a further embodiment of any of the foregoing embodiments, the trunk includes an elbow at which the trunk turns from a first trunk section to a second trunk section, the second trunk section and the at least one branch define a cavity radially there between, and there is a seal disposed in the cavity.

In a further embodiment of any of the foregoing embodiments, the branched flange includes a tertiary branch that extends off of the at least one branch.

In a further embodiment of any of the foregoing embodiments, the at least one branch is orthogonal to the trunk.

A further embodiment of any of the foregoing embodiments includes a seal supported by the at least one branch.

In a further embodiment of any of the foregoing embodiments, the at least one branch defines a pocket and the seal is disposed in the pocket.

In a further embodiment of any of the foregoing embodiments, the at least one branch extends at an oblique angle to the trunk.

In a further embodiment of any of the foregoing embodiments, the trunk has a base at second radial side and a free tip end distal from the base, and the at least one branch extends off of the trunk at a location intermediate of the base and the free tip end.

In a further embodiment of any of the foregoing embodiments, the laminated composite airfoil fairing is a ceramic matrix composite.

In a further embodiment of any of the foregoing embodiments, the platform includes an axially-facing side, and the at least one branch overhangs the axially-facing side.

A gas turbine engine according to an example of the present disclosure includes a compressor section, a combustor in fluid communication with the compressor section, and a turbine section in fluid communication with the combustor. The turbine section has airfoils disposed about a central axis of the gas turbine engine. Each of the airfoils includes a ceramic matrix composite airfoil fairing that defines a platform having first and second radial sides, an airfoil section that extends off of the first radial side, and a branched flange that extends off of the second radial side. The branched flange includes a trunk radially that extends off of the second radial side and at least one branch that extends off of the trunk.

In a further embodiment of any of the foregoing embodiments, the platform includes an axially-facing side, the at least one branch overhangs the axially-facing side. The trunk includes an elbow at which the trunk turns from a first trunk section to a second trunk section. The second trunk section and the at least one branch define a cavity radially there between, and there is a seal disposed in the cavity.

In a further embodiment of any of the foregoing embodiments, the at least one branch defines a pocket and there is a seal is disposed in the pocket.

An article for a gas turbine engine according to an example of the present disclosure includes a fiber-reinforced laminate composite body that defines a core gas path side and an opposed, non-core gas path side, and a branched flange that extends off of the non-core gas path side. The branched flange includes a trunk radially that extends off of the second radial side and at least one branch that extends off of the trunk.

In a further embodiment of any of the foregoing embodiments, the at least one branch includes first and second branches that extend in opposite directions off of the trunk.

In a further embodiment of any of the foregoing embodiments, the trunk includes an elbow at which the trunk turns from a first trunk section to a second trunk section. The second trunk section and the at least one branch define a cavity radially there between, and there is a seal disposed in the cavity.

In a further embodiment of any of the foregoing embodiments, the branched flange includes a tertiary branch that extends off of the at least one branch.

In a further embodiment of any of the foregoing embodiments, the at least one branch defines a pocket and there is a seal is disposed in the pocket.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 5 illustrates a branched flange with a branch that is sloped at an oblique angle.

FIG. 6 illustrates a branched flange with a branch that has an elbow.

FIG. 7 illustrates a branched flange on the inner platform.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
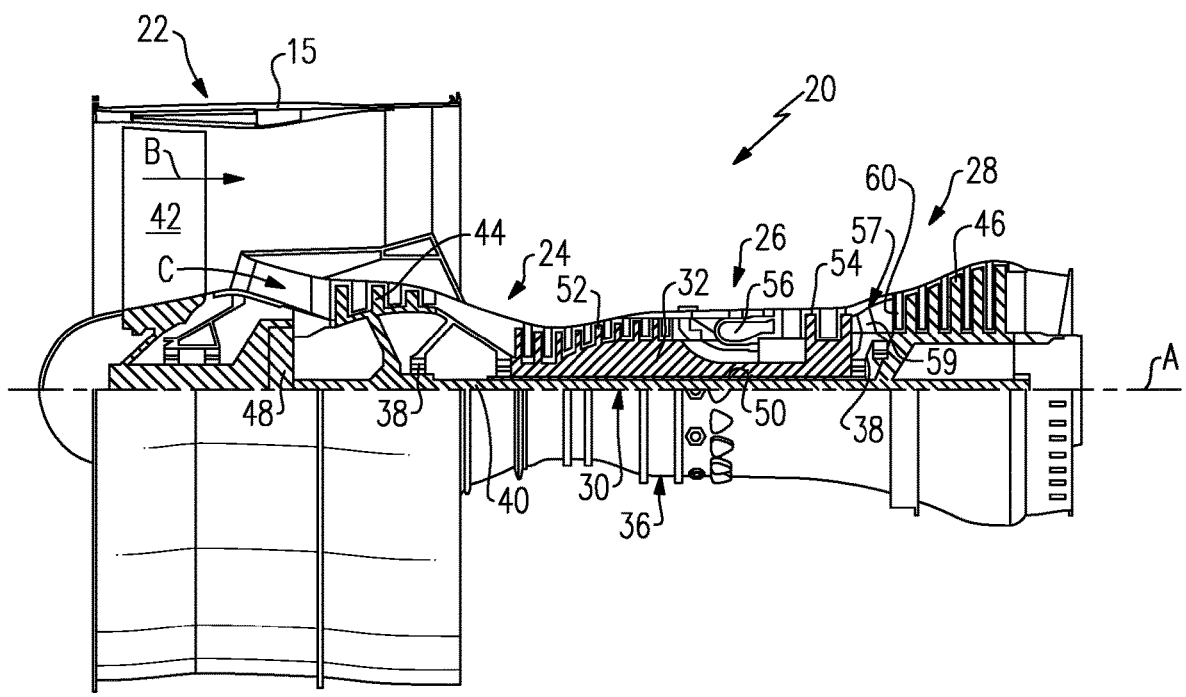
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
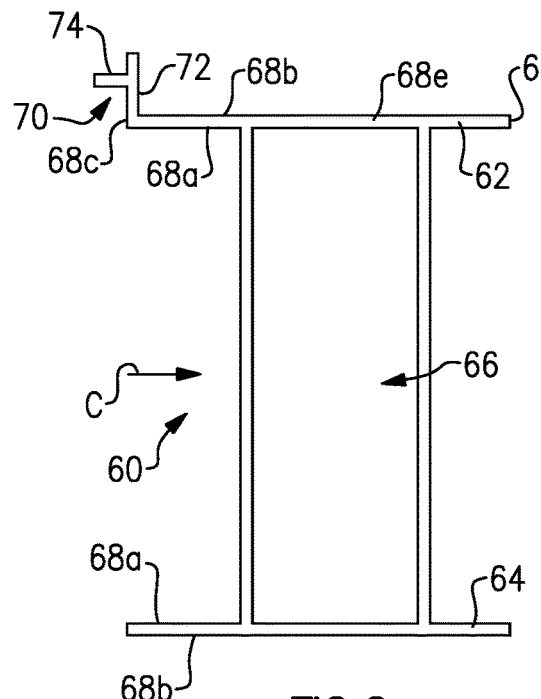
FIG. 2 illustrates an article from the engine, namely a turbine vane in this example.

FIG. 2 illustrates a gas turbine engine article 60 from the engine 20. To demonstrate an example implementation in accordance with this disclosure, the article 60 is depicted as a turbine vane from the turbine section 28 of the engine 20. A plurality of the turbine vanes are arranged in a circumferential row about the engine central longitudinal axis A. It is to be understood, however, that the article 60 is not limited to vanes or airfoils and that the examples herein may also be applied to blade outer air seals, combustor liners, support rings, or other engine articles, particularly those along the core gas path C.

The turbine vane is comprised of several sections, including first and second platforms 62/64 and an airfoil section 66 that extends between the platforms 62/64. The airfoil section 66 generally defines a leading edge, a trailing edge, and pressure and suction sides. In this example, the first platform 62 is a radially outer platform and the second platform 64 is a radially inner platform. It is also contemplated, however, that in modified examples the turbine vane could alternatively have the first platform 62 as a single platform, with no second platform 64, in which case the single platform may be at either the radially inner or outer end of the airfoil section 66. Terms such as "inner" and "outer" used herein refer to location with respect to the central engine axis A, i.e., radially inner or radially outer. Moreover, the terminology "first" and "second" used herein is to differentiate that there are two architecturally distinct components or features. It is to be further understood that the terms "first" and "second" are interchangeable in that a first component or feature could alternatively be termed as the second component or feature, and vice versa.

Each of the platforms 62/64 defines a first radial side 68a (core gas path side), an opposed second radial side 68b (non-core gas path side), an axially forward-facing leading side 68c, and axially aft-facing trailing side 68d, as well as circumferential mate faces 68e (one visible). Articles 60 other than turbine vanes that do not have a platform may have a main body that bounds a portion of the core gas path C and thus defines sides/faces that are analogous to the sides/faces above.

The article 60 is formed of a fiber-reinforced laminate composite. For example, in hot sections of the engine 20, such as the combustor 26 or turbine section 28, the fiber-reinforced laminate composite may be a ceramic matrix composite (CMC). In other sections or in sections where temperatures permit, the fiber-reinforced laminate composite may be an organic matrix composite (OMC) or a metal matrix composite (MMC). A CMC is formed of ceramic fiber tows that are disposed in a ceramic matrix. As an example, the CMC may be, but is not limited to, a SiC/SiC composite in which SiC fiber tows are disposed within a SiC matrix. Example OMCs include, but are not limited to, glass fiber tows, carbon fiber tows, and/or aramid fiber tows disposed in a polymer matrix, such as epoxy. Example MMCs include, but are not limited to, boron carbide fiber tows and/or alumina fiber tows disposed in a metal matrix, such as aluminum. The fiber tows are arranged in a fiber architecture, which refers to an ordered arrangement of the tows relative to one another. In a "laminate," the fiber tows are provided in layers of stacked fiber plies (e.g., layers which may be woven, braided, knitted, unidirectional, etc.) embedded in the matrix.

Whether it is a turbine vane or other component in the core gas path C, the article 60 requires axial, radial, and circumferential constraints to inhibit motion when loaded by gas path and/or secondary flow forces. Attachment of fiber-reinforced laminate composite articles in an engine, however, is challenging. Attachment features, such as hooks, that are typically used for metal alloy components can result in inefficient loading if employed in a composite article design, which may be sensitive to stress directionality and distress conditions that differ from those of metal alloy components. Additionally, features such as linear feather-seal slots, variable thickness walls, buttresses, gussets, weldments, complex-geometry investment casting cores, bare machined surfaces, etc. that may be used in metal alloy components are generally not acceptable or attainable in composite article designs. Stress loading, mechanical and thermal constraints, sealing requirements, and composite manufacturing limitations further complicate attachment designs for composite articles. Accordingly, an attachment scheme that facilitates addressing these considerations is needed for composite articles, and particularly for CMC article that are of interest in the turbine section 28. In this regard, as will be discussed in further detail below, the article 60 includes a branched flange 70.

The branched flange 70 includes a trunk 72 that radially extends off of the second radial side 68b and at least one branch 74 that extends off of the trunk 72. The trunk 72 is an upstanding wall portion of the platform 62 that projects radially (outwardly in this example) from a base at the second radial side 68b to a free tip end. In this example, the trunk 72 is located along the forward-facing leading side 68c so as to be flush there with. For instance, the trunk 72 may be elongated in the circumferential direction between the circumferential mate faces 68e and may fully or substantially fully span the faces 68e. Alternatively, the trunk 72 could be located along the aft-facing trailing face 68d or at a location axially intermediate of the faces 68c/68d. In this example, there is a single branch 74 that projects axially forward off of the trunk 72 such that it overhangs the axially forward-facing side 68c and is approximately orthogonal to the trunk 72 relative to the central axes of the branch 74 and trunk 72. As will be discussed in further detail below, the branch 74 may serve to mate with a component that is adjacent to the article 60, such as a blade outer air seal. As used herein, a "branch" is an appendage that projects from the trunk at a location intermediate of the free tip end of the trunk and the base of the trunk where it transitions into the main portion of the platform 62/64 (or main body in the case of an article that is not an airfoil). Thus, the trunk will have a free tip end that is distinct from the free tip end of the branch.

Figure 3:
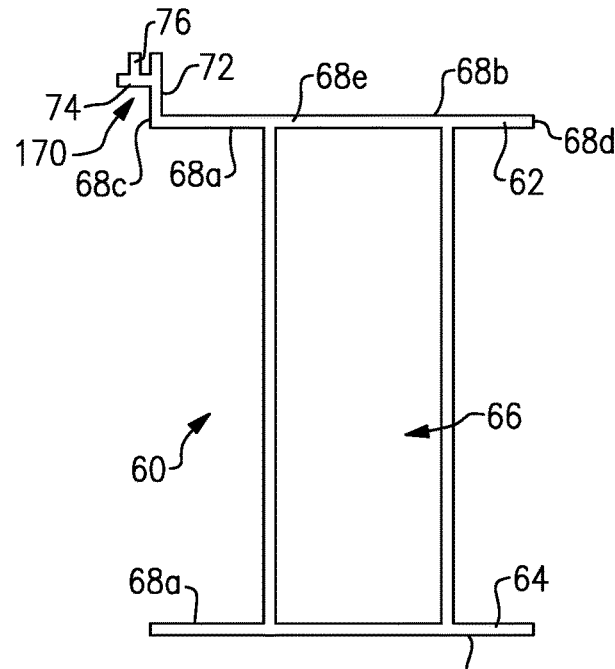
FIG. 3 illustrates a branched flange with a tertiary branch.

FIGS. 2 through 7 depict example branched flange configurations. Although described separately, it is to be understood that the article 60 may include multiple branched flanges of two or more of these configurations and/or individual branched flanges that combine several configurations. In the example of FIG. 3, the branched flange 170 includes the trunk 72 and the branch 74, but additionally includes a tertiary branch 76 that extends off of the branch 74. The tertiary branch 76 projects radially (outwardly in this example) from the branch 74. As used herein, "tertiary" indicates that the branch 76 emanates from the branch 74 rather than off of the trunk 72. Thus, the tertiary branch 76 is connected to the trunk 72 indirectly via the branch 74.

Figure 4:
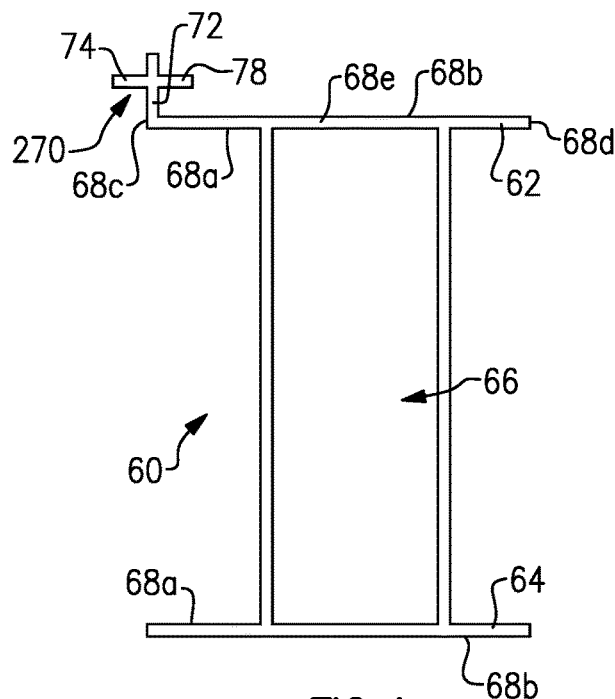
FIG. 4 illustrates a branched flange that has branches in opposite directions.

In the branched flange 270 of FIG. 4, the branch 74 is a first branch and there is a second branch 78 that also extends off of the trunk 72. In this example, the branch 78 extends from the trunk 72 in the opposite axial direction of the first branch 74. The second branch 78 is approximately orthogonal to the trunk 72 relative to the central axes of the branch 78 and trunk 72. In this example, the second branch 78 and the first branch 74 are at a common radial location on the trunk 72, although in other examples the branches 74/78 may be radially offset from one another.

In the branched flange 370 of FIG. 5, the branch 174 is similar to the branch 74 of FIG. 2 except that the branch 174 extends at an oblique angle to the trunk 72 with respect to their central axes. As shown, the branch 174 is outwardly sloped such that the free tip end of the branch 174 is radially outwards of the base of the branch 174 at the trunk 72. Alternatively, the branch 174 may be sloped inwardly such that the free tip end is radially inwards of the base.

In the examples above, the branches 74/76/78 are straight (i.e., straight from the base to the free tip end in a radial cross-section along a plane that includes the engine central longitudinal axis A). However, in the example in FIG. 6, the branch 274 has an elbow 274a at which the branch 274 turns. In this case, the turn is radially outwards, but it alternatively could be radially inwards. The angle of the elbow 274a as shown is an oblique angle, with respect to the central axes of the sections of the branch 274 to each side of the elbow 274a.

In FIG. 7, the branched flange 570 extends from the second platform 64 (radially inner) instead of the first platform 62 (radially outer). The branch 374 extends axially forward off of the trunk 72 and may be used in cooperation with a mating component 80 as an anti-rotation feature.

Figure 8:
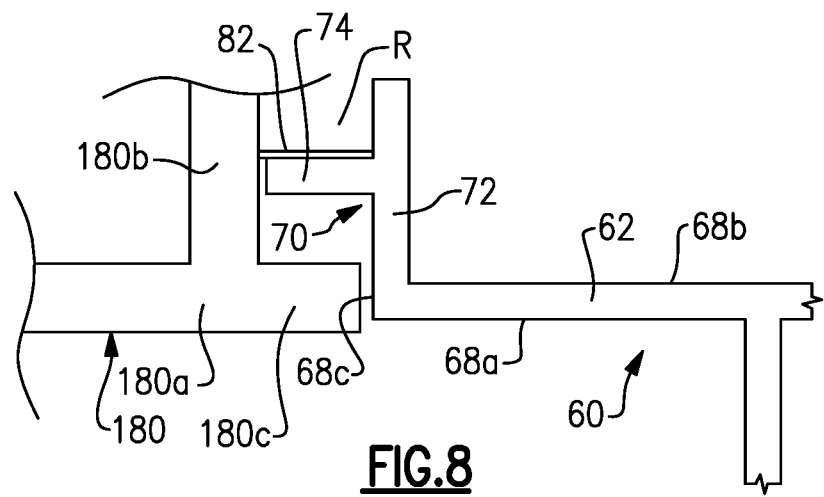
FIG. 8 illustrates a branched flange and a mating component.
Figure 9:
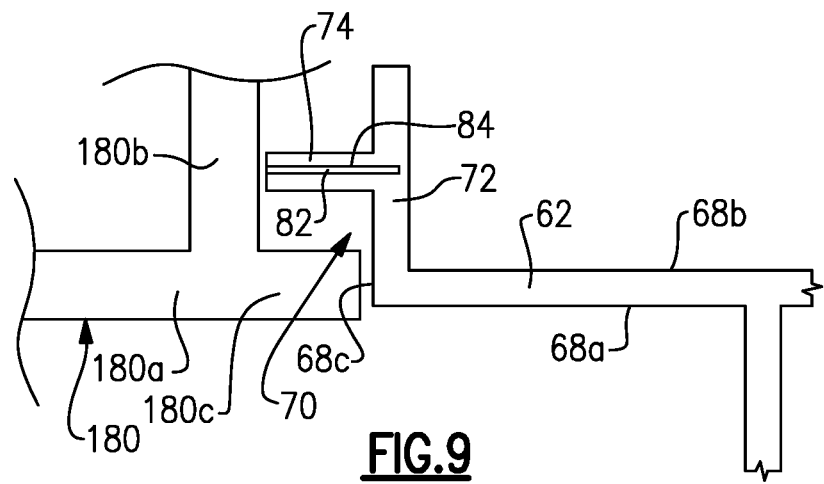
FIG. 9 illustrates a branched flange with a pocket and a seal.
Figure 10:
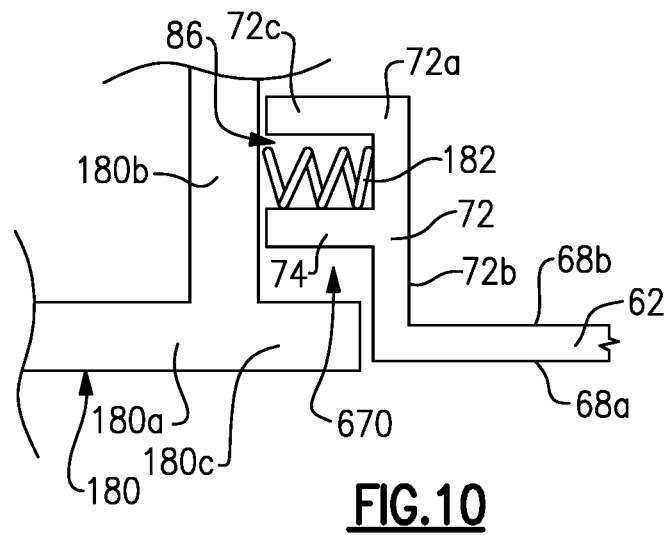
FIG. 10 illustrates a branched flange with a cavity for a seal.

FIGS. 8 through 10 demonstrate additional branched flange configurations and examples of the functionality of branched flanges. In FIG. 8, there is a mating component 180 upstream of the article 60. The mating component 180 has a wall 180a with a radial section 180b and an axial section 180c that extends axially beyond the radial section 180b. The mating component 180 is to abut the article 60, such as to provide support, constraint, sealing, or for other reasons. But for the branch 74 of the branched flange 70, the article 60 would abut the axial face of the axial section 180c. However, for design, performance, or other purposes such a contact location may be undesirable. The branch 74, which overhangs the axially-facing forward side 68c of the platform 62 abuts the radial section 180b of the component 180, which may be a more desirable location. Additionally, in this example there is a seal 82 supported on the branch 74. For example, the seal 82 is a feather seal, but is not limited thereto. The seal 82 may abut the radial wall 180b and thus limit air flow between the tip end of the branch 74 and the radial wall 180b. The seal 82 may be held in place by a clip or other type of fastener (not shown) and/or by a back pressure provided in region R, and the seal 82 may be segmented or a full hoop and keep concentric at the end of the branch 74.

The branched flange 70 in FIG. 9 is the same as in FIG. 2 except that the branch 74 defines a pocket 84 and the seal 82 is disposed in the pocket 84. For example, the pocket 84 is a slot that is of analogous shape to the seal to facilitate retaining the seal in a sealing position. The pocket 84 may extend substantially the full circumferential length of the branch 74. The circumferential ends of the pocket 84 may be closed such that the seal 82 is prevented from substantially shifting in the circumferential direction.

The trunk 72 of the branched flange 670 in FIG. 10 has an elbow 72a such that a first section 72b of the trunk 72 that is proximate the platform 62 is radially elongated and a second, distal section 72c of the trunk 72 is axially elongated. The branch 74 is radially offset from the distal section 72c such that there is a cavity 86 defined radially there between. A seal 182 is disposed in the cavity 86. In this example, the seal is a "W" seal but is not limited thereto. Additionally or alternatively, in any of the examples in FIGS. 8 through 10, the branched flange could include a second branch as in FIG. 4 to mate with another component that is aft of the trunk 72 and/or to support a seal.

The present disclosure demonstrates example configurations of branched flanges that can be adapted to the geometry of an interface with one or more mating components to facilitate loading, constraining, and sealing the fiber-reinforced laminate composite article 60. Moreover, the geometries of the disclosed branched flanges are amenable to manufacture by known composite manufacturing techniques, such as fiber ply lay-up. For example, during ply lay-up layers of the fiber plies in the platform 62 (or 64) are turned up to form the trunk 72 and one or more layers of the fiber plies in the trunk 72 are turned to form the branch or branches. Mandrels or other backing may be used to assist formation of a desired geometry. Thus, there are at least two or more layers of fiber plies that are continuous through the platform 62 (or 64), trunk 72, and branch or branches.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil for a gas turbine engine, the airfoil comprising:
    a fiber-reinforced laminate composite airfoil fairing defining a platform having first and second radial sides, an airfoil section extending off of the first radial side, and a branched flange extending off of the second radial side,
    the branched flange including a trunk radially extending off of the second radial side and at least one branch extending off of the trunk, and
    the platform including an axially-facing side, and the at least one branch overhanging the axially-facing side.

2. The airfoil as recited in claim 1, wherein the at least one branch includes first and second branches.

3. The airfoil as recited in claim 1, wherein the first and second branches extend in opposite directions off of the trunk.

4. The airfoil as recited in claim 1, wherein the trunk includes an elbow at which the trunk turns from a first trunk section to a second trunk section, the second trunk section and the at least one branch define a cavity radially there between, and there is a seal disposed in the cavity.

5. The airfoil as recited in claim 1, wherein the branched flange includes a tertiary branch that extends off of the at least one branch.

6. The airfoil as recited in claim 1, wherein the at least one branch is orthogonal to the trunk.

7. The airfoil as recited in claim 1, further comprising a seal supported by the at least one branch.

8. The airfoil as recited in claim 7, wherein the at least one branch defines a pocket and the seal is disposed in the pocket.

9. The airfoil as recited in claim 1, wherein the at least one branch extends at an oblique angle to the trunk.

10. The airfoil as recited in claim 1, wherein the trunk has a base at second radial side and a free tip end distal from the base, and the at least one branch extends off of the trunk at a location intermediate of the base and the free tip end.

11. The airfoil as recited in claim 1, wherein the laminated composite airfoil fairing is a ceramic matrix composite.

12. A gas turbine engine comprising:
a compressor section;
a combustor in fluid communication with the compressor section; and
a turbine section in fluid communication with the combustor, the turbine section having airfoils disposed about a central axis of the gas turbine engine, each of the airfoils includes:
a ceramic matrix composite airfoil fairing defining a platform having first and second radial sides, an airfoil section extending off of the first radial side, and a branched flange extending off of the second radial side,
the branched flange including a trunk radially extending off of the second radial side and at least one branch extending off of the trunk, and
the platform including an axially-facing side, the at least one branch overhanging the axially-facing side.

13. The gas turbine engine as recited in claim 12, wherein the trunk includes an elbow at which the trunk turns from a first trunk section to a second trunk section, the second trunk section and the at least one branch define a cavity radially there between, and there is a seal disposed in the cavity.

14. The gas turbine engine as recited in claim 12, wherein the at least one branch defines a pocket and there is a seal is disposed in the pocket.

15. An article for a gas turbine engine, the article comprising:
a fiber-reinforced laminate composite body defining a core gas path side and an opposed, non-core gas path side, and a branched flange extending off of the non-core gas path side,
the branched flange including a trunk radially extending off of the second radial side and at least one branch extending off of the trunk, and
the branched flange including a tertiary branch extending off of the at least one branch.

16. The article as recited in claim 15, wherein the at least one branch includes first and second branches that extend in opposite directions off of the trunk.

17. The article as recited in claim 15, wherein the trunk includes an elbow at which the trunk turns from a first trunk section to a second trunk section, the second trunk section and the at least one branch define a cavity radially there between, and there is a seal disposed in the cavity.

18. The article as recited in claim 15, wherein the at least one branch defines a pocket and there is a seal is disposed in the pocket.

* * * * *